United States Patent
Mochizuki

(10) Patent No.: US 10,320,998 B2
(45) Date of Patent: Jun. 11, 2019

(54) INFORMATION PROCESSING SYSTEM, IMAGE FORMING APPARATUS, CONTROL METHODS THEREOF, AND STORAGE MEDIUM

(71) Applicant: CANON KABUSHIKI KAISHA, Tokyo (JP)

(72) Inventor: Hirofumi Mochizuki, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/709,755

(22) Filed: Sep. 20, 2017

(65) Prior Publication Data
US 2018/0097949 A1 Apr. 5, 2018

(30) Foreign Application Priority Data
Sep. 30, 2016 (JP) .................................. 2016-194773

(51) Int. Cl.
*H04N 1/00* (2006.01)
*H04L 29/08* (2006.01)
*H04L 29/06* (2006.01)

(52) U.S. Cl.
CPC ....... *H04N 1/00506* (2013.01); *H04L 67/141* (2013.01); *H04N 1/00344* (2013.01); *H04N 1/00384* (2013.01); *H04N 1/00973* (2013.01); *H04L 67/42* (2013.01); *H04N 2201/0082* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0223324 A1* | 10/2005 | Tashiro | ............ | G03G 15/5016 715/273 |
| 2012/0302167 A1* | 11/2012 | Yun | .................... | G06F 3/04883 455/41.2 |
| 2013/0300633 A1* | 11/2013 | Horio | .................... | G06F 3/1454 345/2.2 |

(Continued)

FOREIGN PATENT DOCUMENTS

JP      2005208974 A     8/2005

*Primary Examiner* — Helen Zong
(74) *Attorney, Agent, or Firm* — Rossi, Kimms & McDowell LLP

(57) ABSTRACT

Upon accepting a first operation of operating a predetermined hardware key, an image forming apparatus preferentially displays a remote support start screen provided from an information processing apparatus via a relay server. Upon accepting a remote support start instruction from a user via the start screen, the image forming apparatus obtains identification information from the relay server and displays the obtained identification information. Upon accepting an operator operation, the information processing apparatus accepts the identification information, connects to the image forming apparatus using the accepted identification information, and activates a remote support client application. Even upon reception of press information of a specific key from the information processing apparatus, the image forming apparatus can display the remote support screen in preference to the display of the operation screen.

11 Claims, 10 Drawing Sheets

(56) References Cited

U.S. PATENT DOCUMENTS

2015/0055165 A1* 2/2015 Fukushima ........ H04N 1/00079
                                                    358/1.14
2017/0302670 A1* 10/2017 Yin ........................... G06F 9/46
2018/0024730 A1* 1/2018 Jambou ............... G06F 3/04847

* cited by examiner

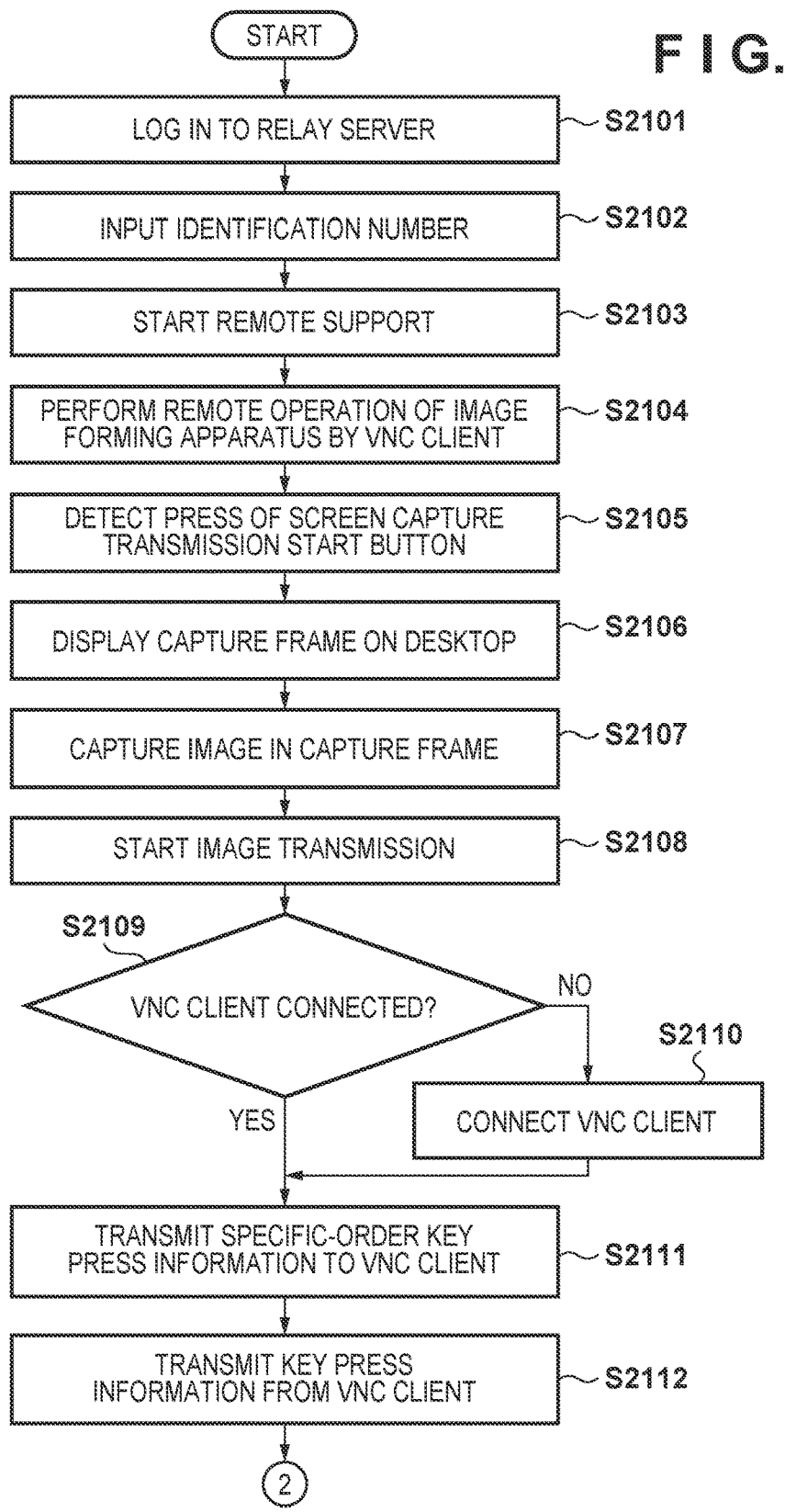

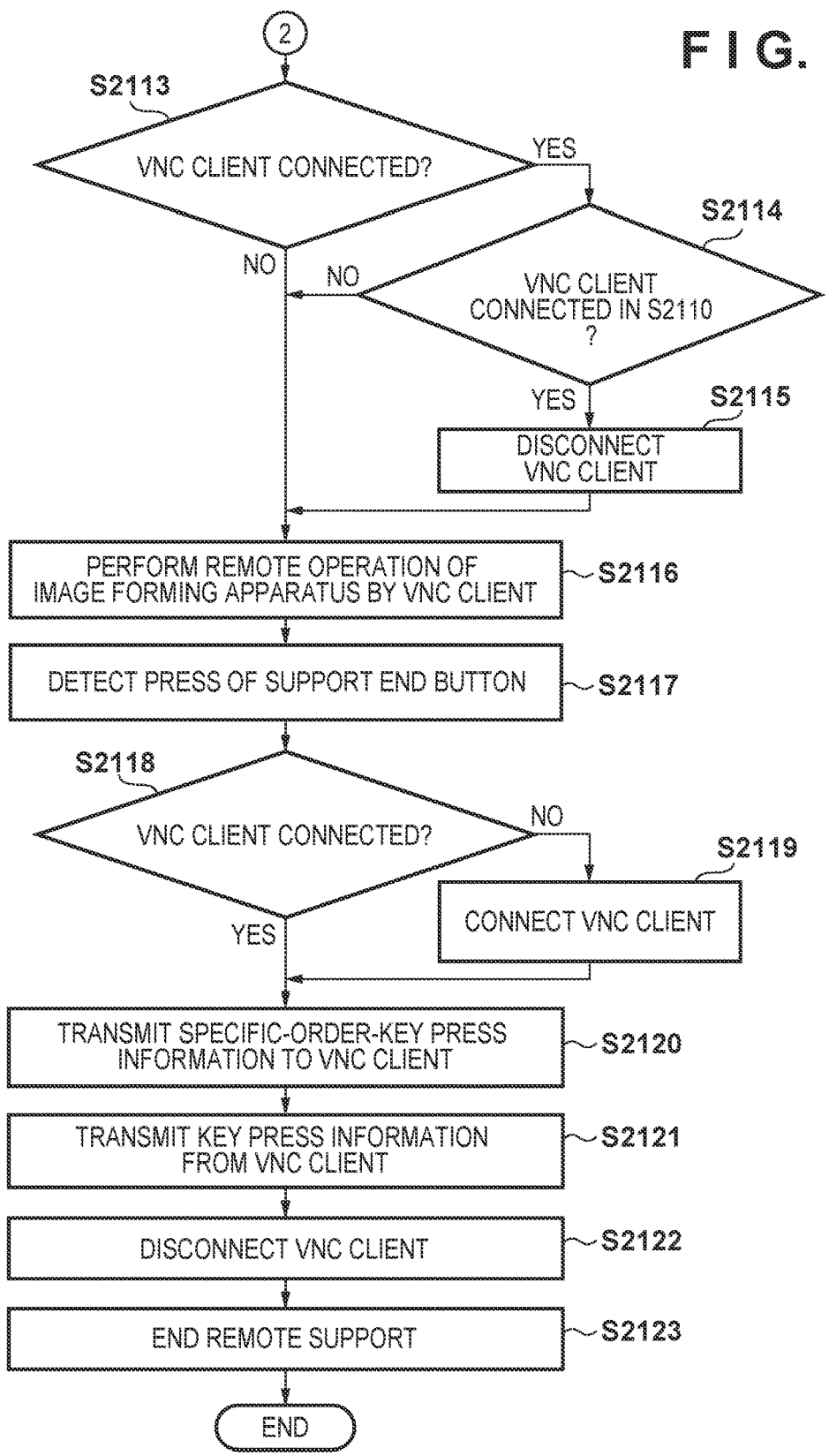

INFORMATION PROCESSING SYSTEM, IMAGE FORMING APPARATUS, CONTROL METHODS THEREOF, AND STORAGE MEDIUM

BACKGROUND OF THE INVENTION

Field of the Invention

The present invention relates to an information processing system, an image forming apparatus, control methods thereof, and a storage medium, all of which provide a remote support service.

Description of the Related Art

When troubleshooting of a product such as an image forming apparatus becomes complicated, a user frequently asks questions to the call center of a manufacturer and obtains answers. In order to quickly perform troubleshooting, Japanese Patent Laid-Open No. 2005-208974 proposes a remote maintenance service between the image forming apparatus and the call center. The remote maintenance service (remote support service) facilitates troubleshooting by remote support without causing call center personnel to visit the site upon occurrence of trouble with the image forming apparatus. It is possible to shorten a time until troubleshooting because a time required to move to the site can be eliminated. In such a remote support system, troubleshooting of the image forming apparatus can be supported by screen sharing, a remote operation of a remote operation client application such as VNC, and information obtainment of the image forming apparatus. For this purpose, the information processing apparatus of the call center must be connected to the image forming apparatus via a network. In the image forming apparatus, a remote support portal screen for starting the remote support is opened to allow a user to perform an operation of starting a connection to the information processing apparatus of the call center, thereby allowing the remote support from the call center.

The above related art, however, poses the following problem. For example, in the above related art, the image forming apparatus which requires the remote support often has an error because the trouble has occurred and the user has called the call center. In general, when a decisive error has occurred in the image forming apparatus, an error screen is displayed so as to cause the user not to operate the screen of the image forming apparatus, and a screen displayed in a normal mode is not displayed. For this reason, when an error has occurred, the user cannot perform the screen operation of opening the remote support portal screen for starting the remote support.

SUMMARY OF THE INVENTION

The present invention enables realization of a mechanism for suitably displaying a screen associated with remote support on an operation unit even if an error has occurred in an image forming apparatus.

One aspect of the present invention provides an information processing system including an image forming apparatus, an information processing apparatus, and a relay server, the image forming apparatus including: a first memory device that stores a set of instructions; and at least one first processor that executes the instructions in the first memory device to: upon accepting a first operation of operating a predetermined hardware key provided in the image forming apparatus, display preferentially, on an operation unit, a remote support start screen provided from the information processing apparatus via the relay server; and upon accepting a remote support start instruction from a user via the start screen, control to obtain identification information for connecting the information processing apparatus from the relay server and display the obtained identification information on the operation unit, and the information processing apparatus including: a second memory device that stores a set of instructions; and at least one second processor that executes the instructions in the second memory device to: accept the identification information by accepting an operation of an operator who uses the information processing apparatus; connect to the image forming apparatus via the relay server using the accepted identification information; and upon connecting to the image forming apparatus, activate a client application of the remote support to start the remote support.

Another aspect of the present invention provides an image forming apparatus communicable with an information processing apparatus via a relay server, comprising: a memory device that stores a set of instructions; and at least one first processor that executes the instructions to: upon accepting a first operation of operating a predetermined hardware key provided in the image forming apparatus, display preferentially, on an operation unit, a remote support start screen provided from the information processing apparatus via the relay server; and upon accepting a remote support start instruction from a user via the start screen, control to obtain identification information for connecting the information processing apparatus from the relay server and display the obtained identification information on the operation unit.

Still another aspect of the present invention provides a control method of an information processing system including an image forming apparatus, an information processing apparatus, and a relay server, the method comprising: in the image forming apparatus, upon accepting a first operation of operating a predetermined hardware key provided in the image forming apparatus, displaying preferentially, on an operation unit, a remote support start screen provided from the information processing apparatus via the relay server; and upon accepting a remote support start instruction from a user via the start screen, obtaining identification information for connecting the information processing apparatus from the relay server and displaying the obtained identification information on the operation unit, and in the information processing apparatus, accepting the identification information by accepting an operation of an operator who uses the information processing apparatus; connecting to the image forming apparatus via the relay server using the accepted identification information; and upon connecting to the image forming apparatus, activating a client application of the remote support to start the remote support.

Yet still another aspect of the present invention provides a control method of an image forming apparatus communicable with an information processing apparatus via a relay server, the method comprising: upon accepting a first operation of operating a predetermined hardware key provided in the image forming apparatus, displaying preferentially, on an operation unit, a remote support start screen provided from the information processing apparatus via the relay server; and upon accepting a remote support start instruction from a user via the start screen, obtaining identification information for connecting the information processing apparatus from the relay server and displaying the obtained identification information on the operation unit.

Still yet another aspect of the present invention provides a non-transitory computer-readable storage medium storing a computer program for causing a computer to execute each step of a control method of an image forming apparatus communicable with an information processing apparatus via a relay server, the control method comprising: upon accepting a first operation of operating a predetermined hardware key provided in the image forming apparatus, displaying preferentially, on an operation unit, a remote support start screen provided from the information processing apparatus via the relay server; and upon accepting a remote support start instruction from a user via the start screen, obtaining identification information for connecting the information processing apparatus from the relay server and displaying the obtained identification information on the operation unit.

Further features of the present invention will be apparent from the following description of exemplary embodiments with reference to the attached drawings.

BRIEF DESCRIPTION OF THE DRAWINGS

FIGS. 8A and 8B are flowcharts showing processing of an operator PC according to the second embodiment.

DESCRIPTION OF THE EMBODIMENTS

Preferred embodiments of the present invention will now be described in detail with reference to the drawings. It should be noted that the relative arrangement of components and the numerical expressions and numerical values set forth in these embodiments do not limit the scope of the present invention unless it is specifically stated otherwise.

First Embodiment

Network Arrangement

The first embodiment of the present invention will be described below. First, the network arrangement of a remote support system (information processing system) according to the first embodiment will be described below with reference to FIG. 1.

This system includes an image forming apparatus 101, an operator PC (image processing apparatus) 102 used by an operator who performs remote support, an HTTP relay server 103, and an authentication server 104. All the above apparatuses are communicably connected via a network 107. The image forming apparatus 101 and the operator PC 102 serve as apparatuses to which the present invention is applied and operate as partner apparatuses. The image forming apparatus 101 and the operator PC 102 have data communication functions of executing call control by HTTP (HyperText Transfer Protocol) to perform data communication.

Figure 1:
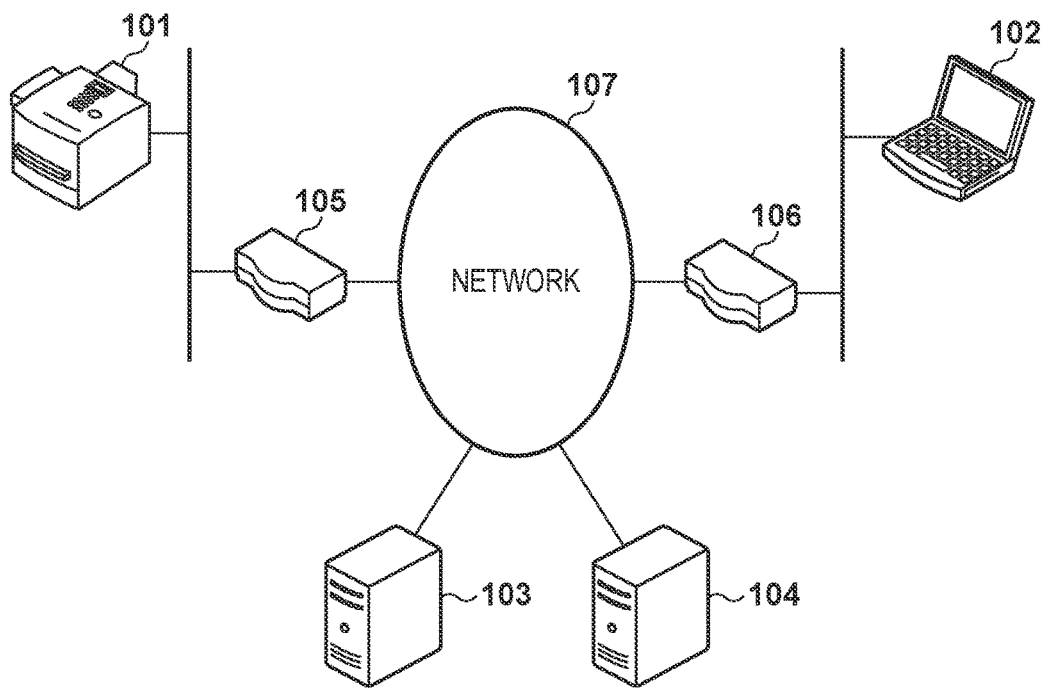
FIG. 1 is a view showing a network arrangement according to the first embodiment.

As shown in FIG. 1, the image forming apparatus 101 is connected to the network 107 via a firewall (FW) 105. The operator PC 102 on the call center side is connected to the network 107 via an FW 106. In addition, the HTTP relay server 103 and the authentication server 104 are connected to the network 107. In HTTP data communication, client nodes perform data communication by sending POST/GET requests to an URI (Uniform Resource Identifier) provided by the HTTP relay server 103. This makes it possible to allow the client nodes to perform data communication even if a communication path is blocked by the private base address area and the FW. The authentication server 104 authenticates that the image forming apparatus 101 is an authentic image forming apparatus.

According to this embodiment, the image forming apparatus 101 and the operator PC 102 operate as HTTP client nodes. In this embodiment, an arrangement in which the client nodes communicate with each other via the FW with respect to the network 107 is exemplified. The present invention is not limited to this. A network arrangement without being through the FW may be applied. In addition, many FWs, image forming apparatuses, and operator PCs larger in number than the illustrated ones may be connected to the network 107. Furthermore, in this embodiment, a protocol other than HTTP may be used as a communication protocol.

Hardware Arrangement

Figure 2:
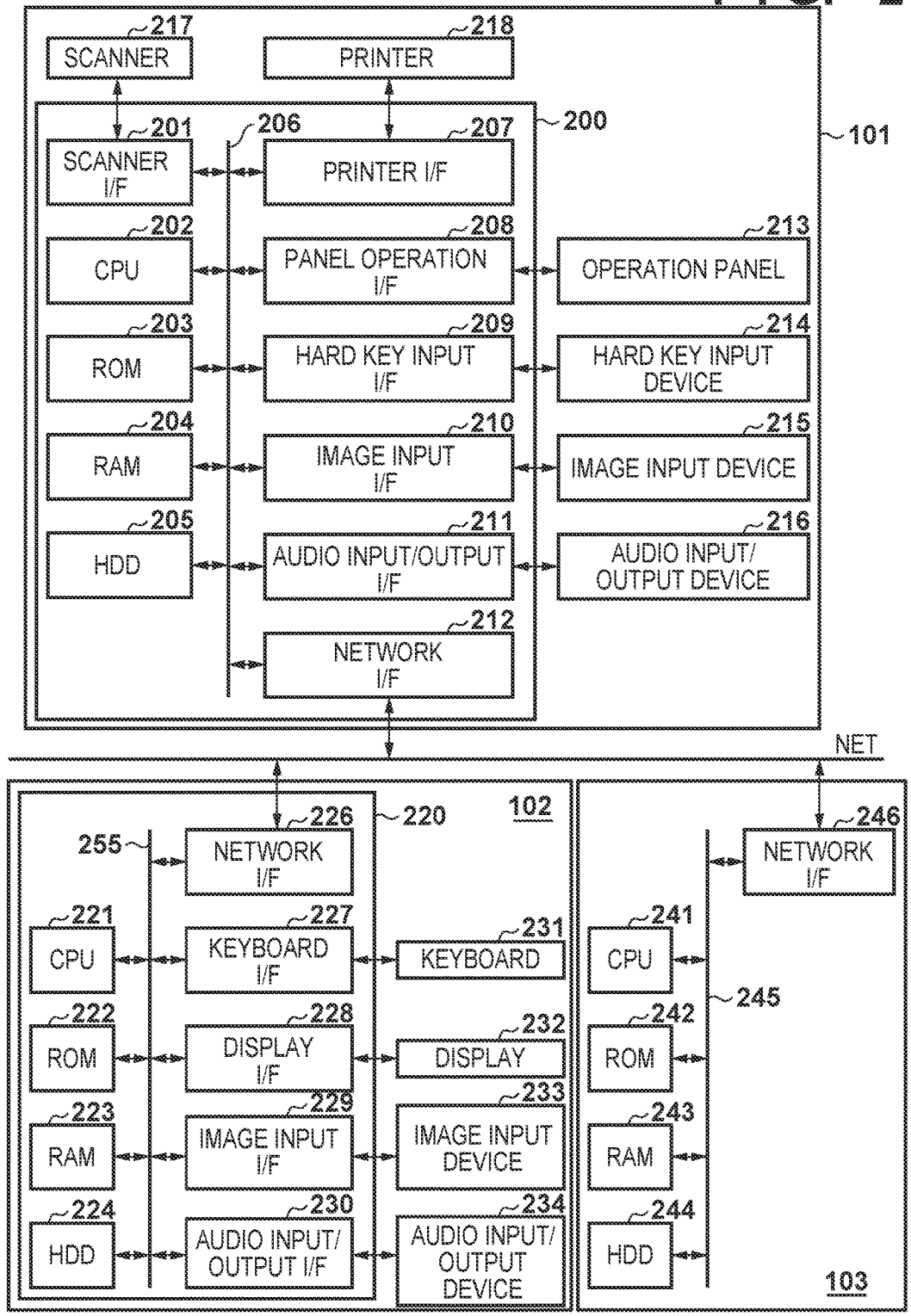
FIG. 2 is a block diagram showing the hardware arrangement of a remote support system according to the first embodiment.

The hardware arrangement of the remote support system according to this embodiment will be described next with reference to FIG. 2. The image forming apparatus 101 includes a system control unit 200, an operation panel 213, a hard key (hardware key) input device 214, an image input device 215, an audio input/output unit 216, a scanner 217, and a printer 218. The system control unit 200 includes a scanner I/F 201, a CPU 202, a ROM 203, a RAM 204, an HDD 205, a printer I/F 207, a panel operation I/F 208, a hard key input I/F 209, an image input I/F 210, an audio input/output I/F 211, and a network I/F 212. The above devices can exchange data via a system bus 206.

The CPU 202 systematically controls access to the various kinds of devices connected to the system bus 206 based on control programs stored in the ROM 203 or the hard disk (HDD) 205. The ROM 203 stores control programs executable by the CPU 202. The RAM 204 functions as a main memory, a work area, and the like of the CPU 202 and its memory capacity can be increased by an optional RAM connected to an expansion port (not shown). The hard disk (HDD) 205 stores a boot program, various kinds of applications, font data, user files, editing files, and the like. Note that in this embodiment, the HDD 205 is used, but an SD card or flash memory other than the HDD 205 may be used as an external storage device.

The scanner I/F 201 controls image input from the scanner 217. The printer I/F 207 controls image output to the printer 218. The panel operation I/F 208 performs display control of the operation panel 213 and controls input of various kinds of setting information set in the operation panel 213. The hard key input I/F 209 controls input from the hard key input device 214. The image input I/F 210 controls image input from the image input device 215 such as a camera. The audio input/output I/F 211 controls audio input/output with respect to the audio input/output unit 216 such as a headset. The network I/F 212 performs data communication with an external network via a network cable.

The operator PC 102 includes a control unit 220, a keyboard 231, a display 232, an image input device 233, and an audio input/output device 234. The control unit 220 includes a CPU 221, a ROM 222, a RAM 223, an HDD 224, a network I/F 226, a keyboard I/F 227, a display I/F 228, an image input I/F 229, and an audio input/output I/F 230.

The CPU 221 systematically controls access to the various kinds of devices connected to the system bus 225 based on control programs stored in the ROM 222 or the hard disk (HDD) 224. The ROM 222 stores control programs executable by the CPU 221. The RAM 223 functions as a main memory, a work area, and the like of the CPU 221 and its memory capacity can be increased by an optional RAM connected to an expansion port (not shown). The hard disk (HDD) 224 stores a boot program, various kinds of applications, font data, user files, editing files, and the like. Note that in this embodiment, the HDD 224 is used, but an SD card or flash memory other than the HDD 224 may be used as an external storage device.

The network I/F 226 performs data communication with an external network via a network cable. The keyboard I/F 227 functions as an accepting unit and controls a key input from the keyboard 231 or a pointing device (not shown). The display I/F 228 controls display of the display 232. The image input I/F 229 controls image input from the image input device 233 such as a camera. The audio input/output I/F 230 controls audio input/output with respect to the audio input/output device 234 such as a headset.

The HTTP relay server 103 includes a CPU 241, a ROM 242, a RAM 243, an HDD 244, and a network I/F 246. The CPU 241 systematically controls access to the various kinds of devices connected to the system bus 245 based on control programs stored in the ROM 242 or the hard disk (HDD) 244. The ROM 242 stores control programs executable by the CPU 241. The RAM 243 functions as a main memory, a work area, and the like of the CPU 241 and its memory capacity can be increased by an optional RAM connected to an expansion port (not shown). The hard disk (HDD) 244 stores, a boot program, various kinds of applications, font data, user files, editing files, and the like. Note that in this embodiment, the HDD 244 is used, but an SD card or flash memory other than the HDD 244 may be used as an external storage device. The network I/F 246 performs data communication with an external network via a network cable.

Screen Example

Screen of Client Application

The screen example of a remote operation client application in the operator PC 102 will be described next with reference to FIG. 3. Reference numeral 301 denotes a window of the remote operation client application. The window 301 is displayed on the display 232 of the operator PC 102. This window 301 is the window of a VNC (Virtual Network Computing) client application. The window 301 will be referred to as a VNC client hereinafter.

Figure 3:
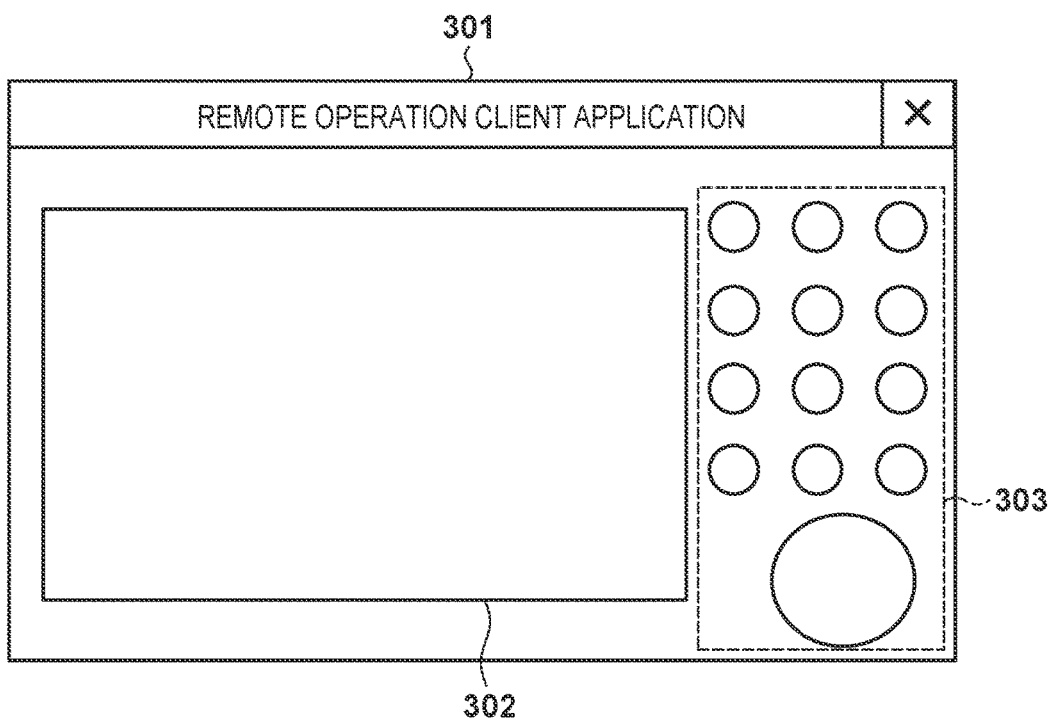
FIG. 3 is a view showing screen example of a remote operation client application of an operator PC according to the first embodiment.

In the example of FIG. 3, the VNC client 301 includes display of a remote screen display unit 302 and display of software keys (soft keys) 303. The same screen as displayed on the operation panel 213 of the remote-operated image forming apparatus 101 is displayed on the remote screen display unit 302. Information obtained by operations on the remote screen display unit 302 is transmitted to the image forming apparatus 101. The software keys 303 have the same keys as those of the hard key input device 214 of the image forming apparatus 101. Pressed key information is transmitted to the image forming apparatus 101. In this embodiment, the remote operation client application is the VNC client.

Remote Support Portal Screen

An example of a remote support portal screen (remote support screen) of the image forming apparatus 101 will be explained next with reference to FIG. 4. A remote support portal screen 401 is a screen displayed on the operation panel 213 of the image forming apparatus 101.

The remote support portal screen 401 is a screen for displaying the operation unit and information for remote support such as the start and end of the remote support, image sharing with the operator PC 102 of the call center, and the like. The remote support portal screen 401 is a screen displayed during the remote support by being appropriately switched with the normal screen. For example, the remote support portal screen 401 is displayed when the user of the image forming apparatus 101 is required to view the help manual and camera video of the operator PC 102 or when the remote support of the image forming apparatus 101 ends. In addition, the remote support portal screen 401 is displayed in preference to the operation screen so that the display and operation are allowed even if an error screen is displayed in the image forming apparatus 101 and the normal operation is set to be disabled.

Figure 4:
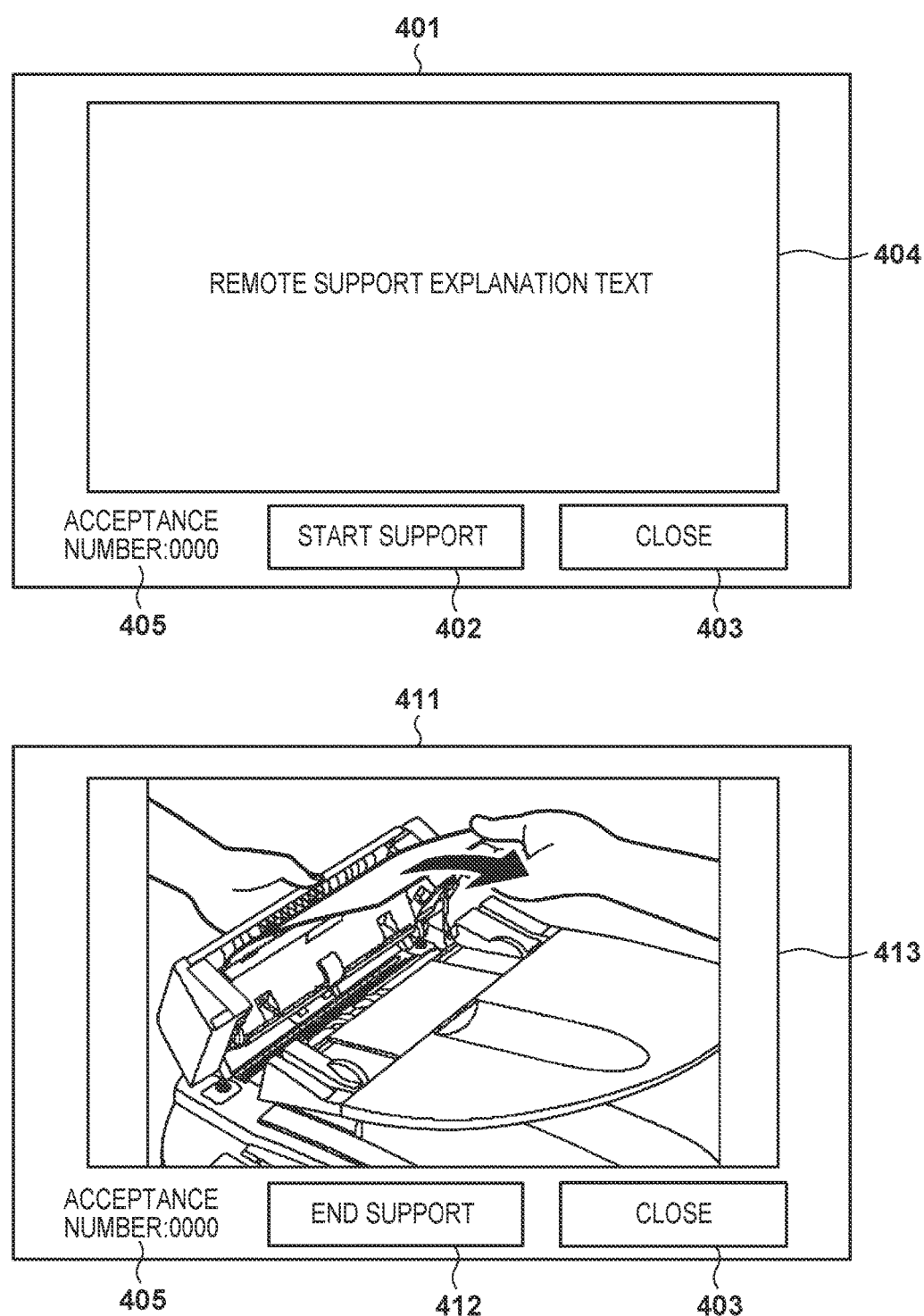
FIG. 4 is a view showing screen examples of remote support portal screens of an image forming apparatus according to the first embodiment.

The remote support portal screen 401 shown in FIG. 4 is an example of the start screen in a state before the start of support. Reference numeral 411 denotes a screen example of the remote support portal screen during the support. Each of the remote support portal screens 401 and 411 is displayed by a predetermined operation (first operation) such as a long press of a predetermined hard key or presses of keys in a predetermined order on the hard key input device 214 of the image forming apparatus 101. The above screen may be displayed by a simultaneous press of a plurality of keys in place of the long press of the predetermined hard key.

The display timing of each of the remote support portal screens 401 and 411 is assigned to a hard key (hardware key) instead of performing a screen operation using software keys displayed on the operation panel 213 of the image forming apparatus 101. This makes it possible to display each of the remote support portal screens 401 and 411 even if the error screen is displayed on the operation panel 213 and the normal operation is limited.

In addition, the remote support portal screen 411 may be displayed on the operation screen of the image forming apparatus 101 by a remote operation from the operator PC 102. In this case, since the operation is substituted by the software keys 303 of the VNC client 301, the pointing device such as a mouse cannot detect the long press of a software key corresponding to an arbitrary hard key or the simultaneous press (multiple press) of the plurality of keys. Accordingly, in the remote operation of the operator PC 102, the remote support portal screen 411 may be displayed by pressing keys in a predetermined order. On the other hand, if the display 232 of the operator PC 102 is a touch panel type display, the long press of the software key or multiple press on the display 232 can be detected. The remote support portal screen 401 may be displayed by this operation.

The remote support portal screen 401 includes a button 402 for starting the remote support and a button 403 for closing the remote support portal screen 401. Even if the screen is closed, the remote support does not end, provided that the remote support has started. The screen returns to the previous screen displayed on the image forming apparatus 101 before the remote support portal screen was opened. A remote support explanation text 404 displays, to the user of the image forming apparatus 101, a message that the remote operation and information obtainment may be performed if the remote support is started. Identification information 405 is a character string issued from the HTTP relay server 103 when the image forming apparatus 101 is connected to the HTTP relay server 103. The identification information 405 is information for allowing the operator PC 102 to identify the image forming apparatus 101 connected to the HTTP relay server.

The remote support portal screen 411 includes a button 412 for ending the remote support. Upon pressing the button 412, the remote support of the image forming apparatus 101 ends to return to the state set before the start of the support. The remote support portal screen 401 before the start of the support is displayed. Reference numeral 413 denotes a reception image display area which displays an image that is obtained by partially capturing the desktop of the operator PC 102 and is received from the operator PC 102 via the HTTP relay server 103, or an image from the camera connected to the operator PC 102.

Processing Sequence of Image Forming Apparatus

The processing sequence of the image forming apparatus 101 according to this embodiment will be described next with reference to FIG. 5. This flowchart is implemented by loading a program stored in, for example, the HDD 205 into the RAM 204 and executing the program by the CPU 202.

First, in step S1001, the CPU 202 of the image forming apparatus 101 detects a predetermined operation such as a long press of a predetermined hard key of the hard key input device 214. Note that a plurality of predetermined keys may be simultaneously pressed or a plurality of keys may be continuously input instead of the long press of the predetermined hard key. When the long press of the hard key is detected, the CPU 202 displays, in step S1002, the remote support portal screen 401 in preference to the display of the operation screen of the image forming apparatus 101 on the operation panel 213. The operation screen includes an error screen in which an error has occurred in the image forming apparatus 101 and the user operation is limited.

In step S1003, the CPU 202 then detects the press of the remote support start button 402 displayed on the remote support portal screen 401 and accepts a start instruction. Upon detecting the press, in step S1004, the CPU 202 transmits the machine body identification information to the authentication server 104. As a result of step S1004, in step S1005, the CPU 202 obtains an authentication token from the authentication server 104. Subsequently, in step S1006, the CPU 202 transmits the obtained authentication token to the HTTP relay server 103. When the HTTP relay server 103 verifies the authentication token, the CPU 202 receives the identification information from the HTTP relay server 103 in step S1007. After that, in step S1008, the CPU 202 displays the identification information 405 based on the received identification information. The identification information 405 is a character string for allowing the HTTP relay server 103 to identify the image forming apparatus 101 and is transmitted from the user of the image forming apparatus 101 to the operator of the call center. When the identification information 405 is input in the operator PC 102, a state in which the image forming apparatus 101 and the operator PC 102 are connected is set. In step S1009, the CPU 202 starts the remote support.

When the remote support starts, in step S1010, the CPU 202 allows remote operation by the VNC client 301 from the operator PC 102. The remote support portal screen 411 may be closed by remote operation of the image forming apparatus 101 by the operator PC 102 or an operation on the operation panel 213 by the user of the image forming apparatus 101. Note that the remote operation in step S1010 need not necessarily be performed.

In step S1011, the CPU 202 then receives specific-order-key press information from the operator PC 102. The specific-order-key press information is information representing detail (second operation) of a plurality of keys that are pressed in a specific order on the operator PC 102. Upon receiving the specific-order-key press information, the CPU 202 displays the remote support portal screen 411 in step S1012. After that, in step S1013, when the CPU 202 detects the press (fourth operation) of the support end button 412 of the remote support portal screen 411, the CPU 202 accepts the end instruction. In step S1014, the remote support of the image forming apparatus 101 is ended to end the processing.

Processing Sequence of Operator PC

Figure 6:
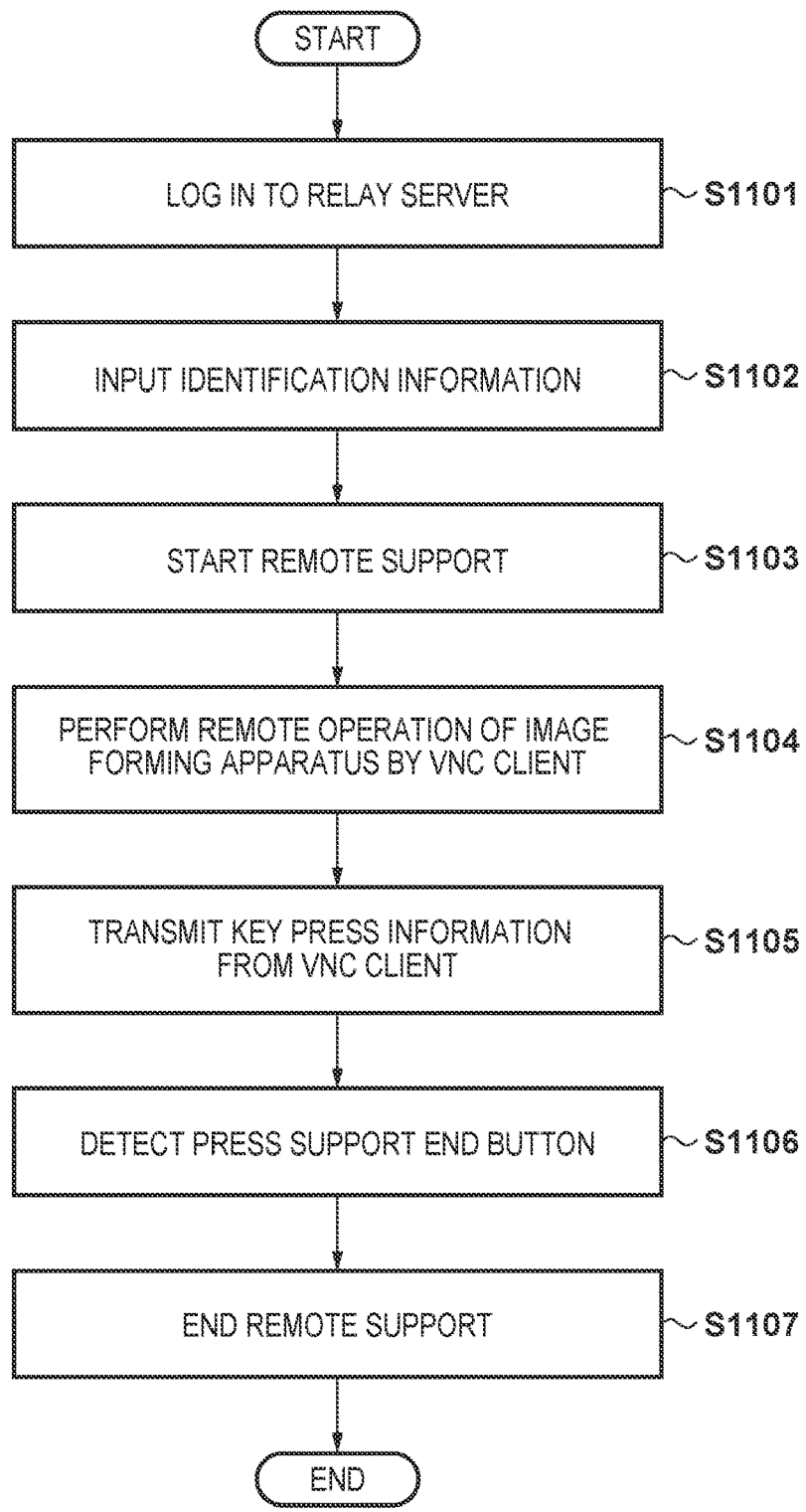
FIG. 6 is a flowchart showing processing of the operator PC according to the first embodiment.

The processing sequence of the operator PC 102 according to this embodiment will be described next with reference to FIG. 6. This flowchart is implemented by loading a program stored in, for example, the HDD 224 into the RAM 223 and executing the program by the CPU 221.

First, in step S1101, the CPU 221 of the operator PC 102 logs in to the HTTP relay server 103. The login is performed by inputting a user name and a password, and the input information is authenticated by the HTTP relay server 103. After the login, the operator causes the user of the image forming apparatus 101 to confirm the identification information 405 displayed in the image forming apparatus 101. In step S1102, the CPU 221 accepts the identification information 405 input by the operator, inputs the identification information 405 to the HTTP relay server 103, and starts the remote support in S1103.

When the remote support is started, in step S1104, the CPU 221 activates the VNC client 301 and is connected to the image forming apparatus 101 via the HTTP relay server 103. This makes it possible to perform the remote operation of the image forming apparatus 101 from the operator PC 102. The setting values of the image forming apparatus 101 are confirmed and changed by the remote operation by, for example, the VNC client 301. In order to confirm and change the setting values, the remote support portal screen 411 must be closed, and the screen must be switched to the setting screen of the image forming apparatus 101. The operation of closing the remote support portal screen 411 is performed by pressing the button 403. The screen displayed before the remote support portal screen 401 is displayed is displayed in the image forming apparatus 101. Note that the operation of closing the remote support portal screen 411 is performed by not only performing the remote operation of the VNC client 301, but also the user operation of the image forming apparatus 101 using the operation panel 213 of the image forming apparatus 101. Note that the remote operation in step S1104 need not necessarily be performed.

In order to end the remote support, the operator presses the keys of the software keys 303 of the VNC client 301 in a specific order, and the CPU 221 transmits the specific-order-key press information from the VNC client 301 to the image forming apparatus 101 in step S1105. The remote support portal screen 411 is displayed on the screen of the image forming apparatus 101 accordingly. After that, in step S1107, the CPU 221 detects that the operator has pressed the support end button of the operator PC 102 to end the remote support. The processing is then ended.

As described above, according to this embodiment, there is provided an information processing system including the image forming apparatus, the information processing apparatus, and the HTTP relay server. When the image forming apparatus accepts the first operation of operating the predetermined hardware key provided in the image forming apparatus, the remote support start screen provided by the information processing apparatus via the HTTP relay server is preferentially displayed on the operation unit. In addition, when the image forming apparatus accepts the remote support start instruction from the user via the start screen, the image forming apparatus obtains the identification information indicating the connection with the information processing apparatus from the HTTP relay server and displays the obtained identification information on the operation unit. When the information processing apparatus accepts the operation from the operator, the information processing apparatus accepts the above identification information, is connected to the image forming apparatus via the HTTP relay server using the accepted identification information, and activates the remote support client application to start the remote support. In addition, when the image forming apparatus receives the specific key press information from the information processing apparatus, the image forming apparatus displays the remote support screen in preference to the display of the operation screen. In this manner, according to this embodiment, the remote support screen is displayed in preference to the display of the operation screen of the image forming apparatus by the hard key operation on the image forming apparatus or the specific-order-key press information from the remote location (operator PC 102). Even if the screen operation on the operation panel of the image forming apparatus is limited upon occurrence of an error, the remote support can be performed.

Second Embodiment

The second embodiment of the present invention will now be described below. The network arrangement and the hardware arrangement of this embodiment are the same as in the first embodiment, and a detailed description thereof will be omitted. If the remote support portal screen is not displayed upon operation of the software keys 303 of the VNC client 301 in the first embodiment, processing for displaying this screen is automated to reduce the operation load of the operator.

Processing Sequence of Image Forming Apparatus

Figure 7A:
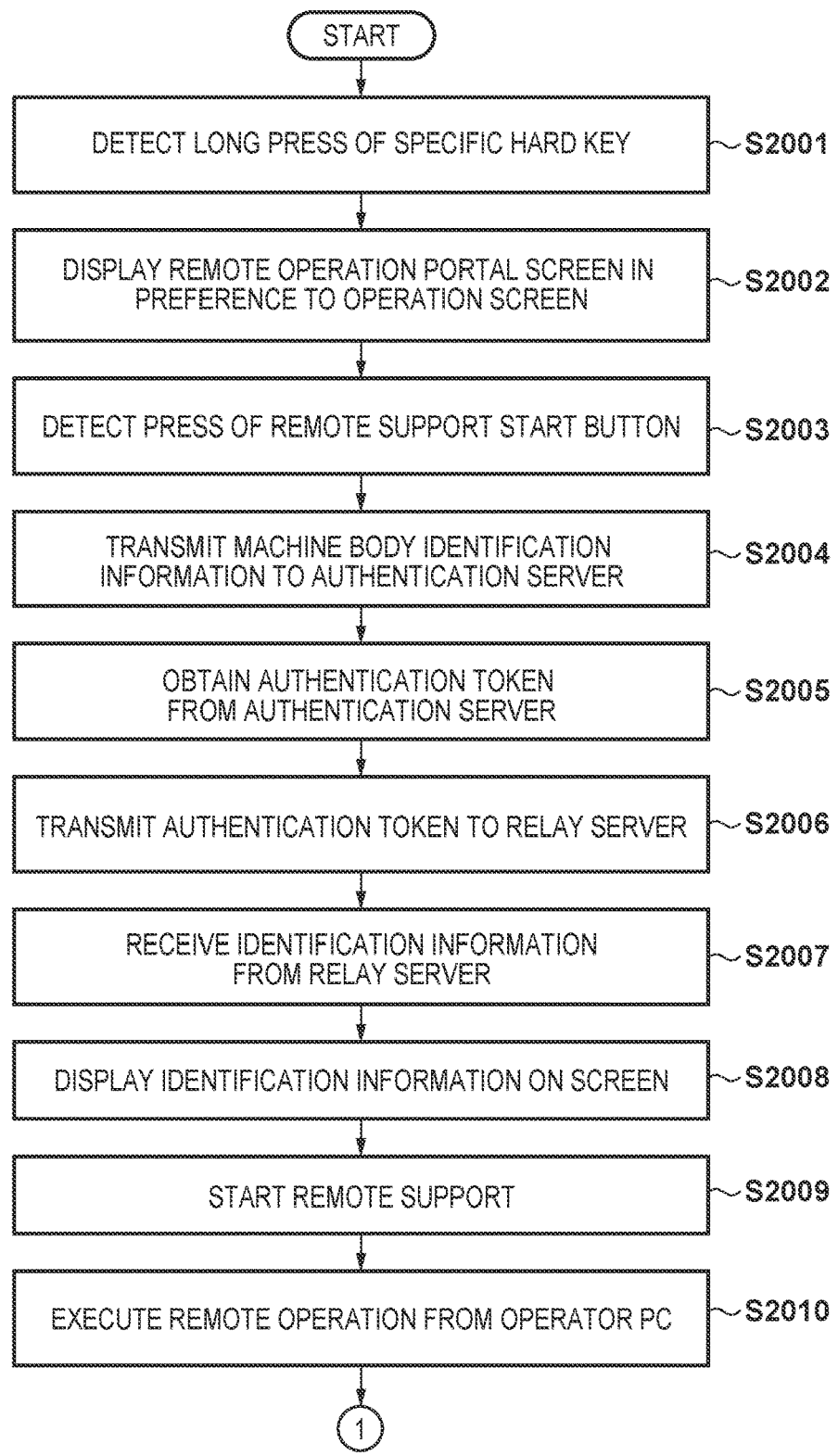
FIGS. 7A and 7B are flowcharts showing processing of an image forming apparatus according to the second embodiment.
Figure 7B:
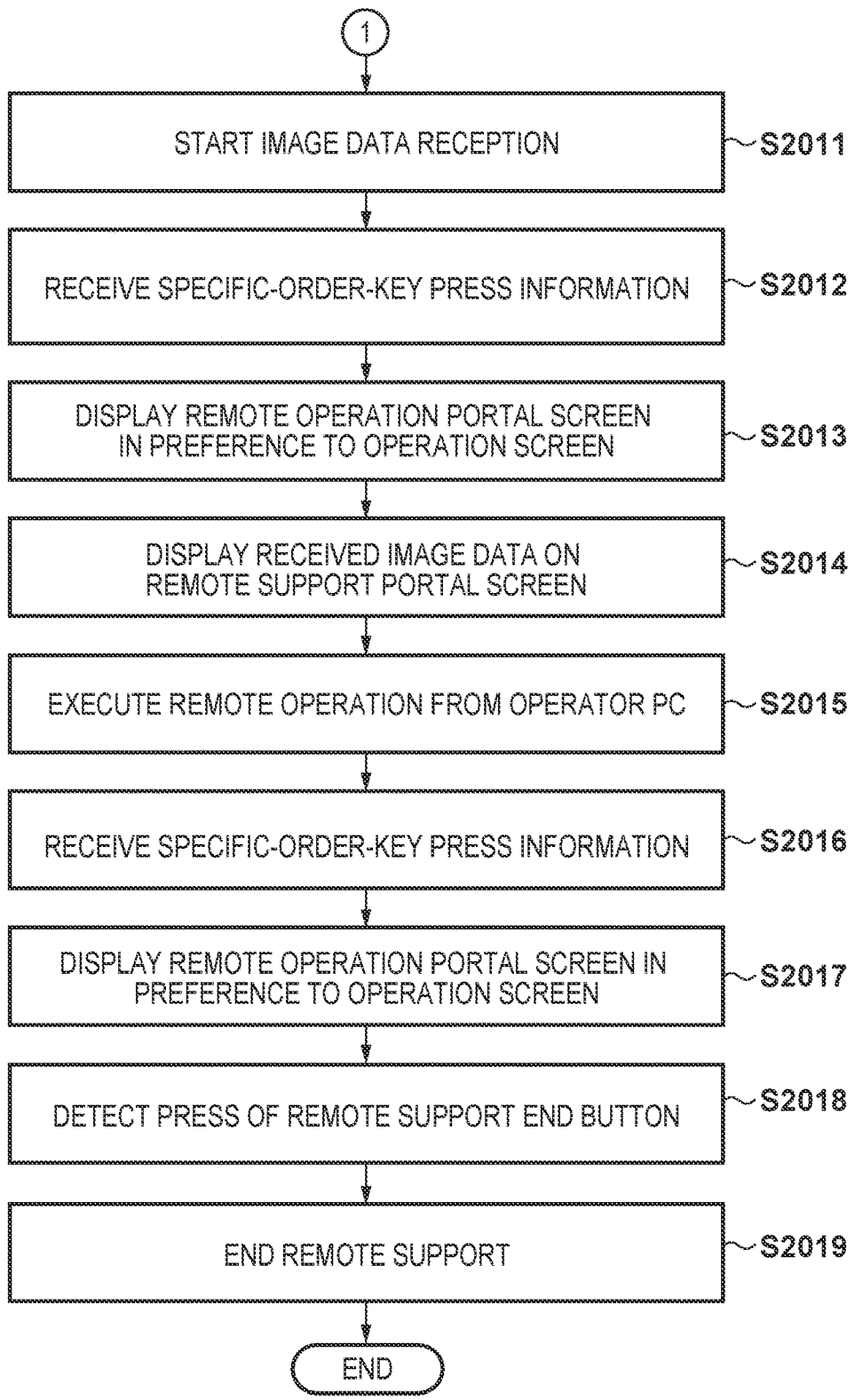

First, the processing sequence in an image forming apparatus 101 according to this embodiment will be described with reference to FIGS. 7A and 7B. This flowchart is implemented by loading a program stored in, for example, an HDD 205 into a RAM 204 and executing by a CPU 202. Note that a part that is the as that in the flowchart of FIG. 5 will not be explained.

Figure 5:
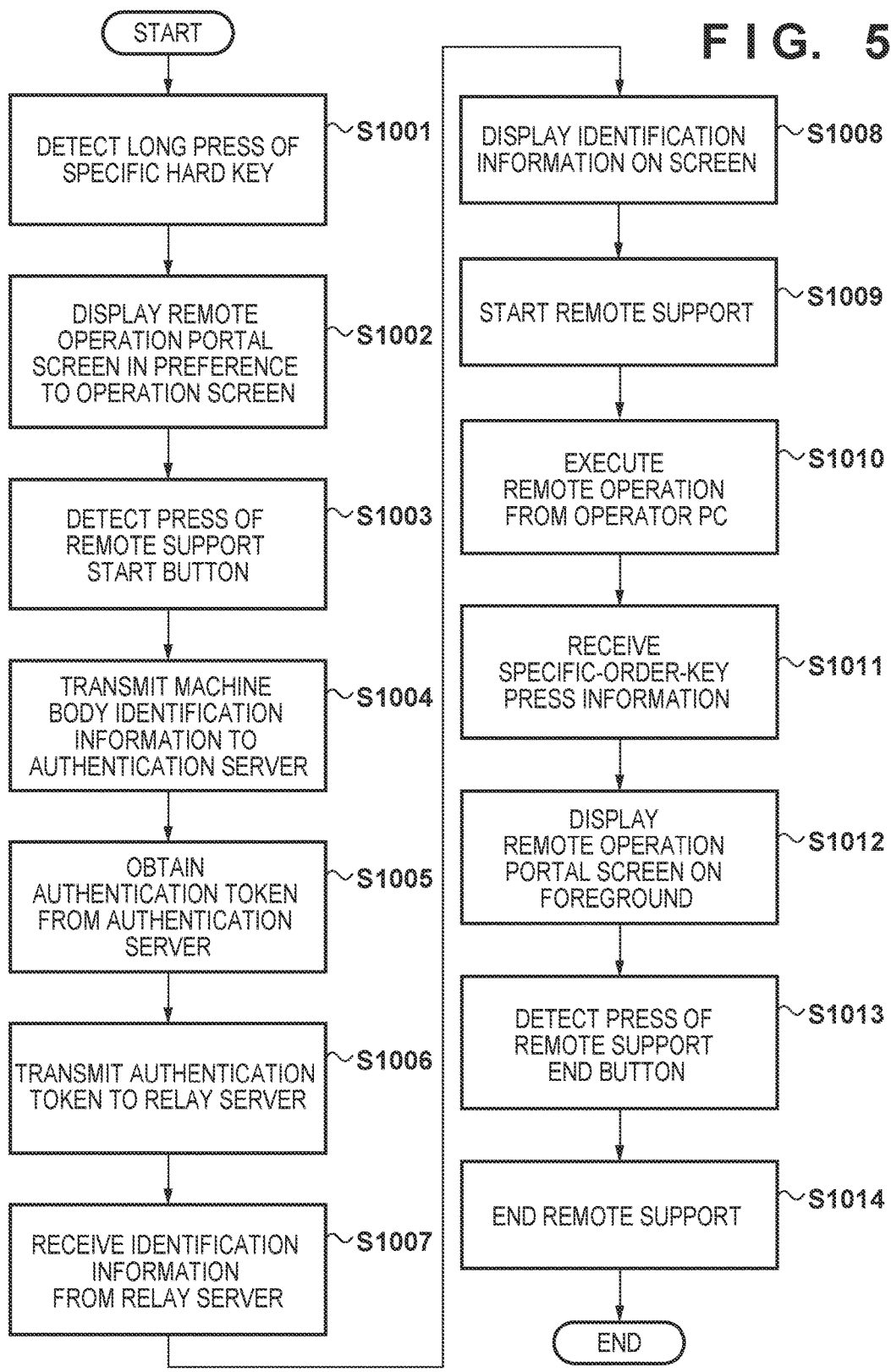
FIG. 5 is a flowchart showing processing of the image forming apparatus according to the first embodiment.

Steps S2001 to S2010 are the same as steps S1001 to S1010 in the flowchart of FIG. 5, and a description thereof will be omitted. In step S2011, the CPU 202 starts reception of the image data from the operator PC 102 by a screen capture transmission start button (not shown) being pressed (third operation) in an operator PC 102. The screen capture transmission start button is displayed in an area except the screen of a VNC client 301.

In step S2012, the CPU 202 receives the specific-order-key press information from the operator PC 102. Upon reception of the specific-order-key press information, the CPU 202 displays a remote support portal screen 411 in preference to other operation screens in step S2013. Subsequently, in step S2014, the CPU 202 displays the received image on a reception image display unit 413. After that, in step S2015, the CPU 202 can perform the remote operation by the VNC client 301 from the operator PC 102. At this time, the remote support portal screen 411 may often be closed by remote operation of the image forming apparatus 101 by the operator PC 102 or a user operation on an operation panel 213 of the image forming apparatus 101. The remote operation in step S2010 need not necessarily be performed.

Upon the support end by the operator PC 102, in step S2016, the CPU 202 receives the specific-order-key press information. Upon reception of the specific-order-key press information, in step S2017, the CPU 202 displays the remote support portal screen 411. Accordingly, a support end button 412 is displayed on the operation panel 213 of the image forming apparatus 101. After that, in step S2018, the CPU 202 detects the press of the support end button 412. The remote support is ended in step S2019, thereby ending the processing.

Processing Sequence of Operator PC

The processing sequence of the operator PC 102 according to this embodiment will be described next with reference to FIGS. 8A and 8B. This flowchart is implemented by loading a program stored in, for example, an HDD 224 into a RAM 223 and executing the program by a CPU 221. Note that a part that is the same as that in the flowchart of FIG. 6 will not be explained. Steps S2101 to S2104 are the same as steps S1101 to S1104 in the flowchart of FIG. 6, and a description thereof will be omitted.

When the user of the image forming apparatus 101 is required to view the help manual or a moving image, the operator presses the screen capture transmission start button displayed in an area that is not the screen of the VNC client 301. In step S2105, the CPU 221 detects the press of the screen capture transmission start button. Upon detecting the screen capture transmission start button, the CPU 221 displays a capture frame on a display 232 of the operator PC 102 in step S2106. Subsequently, in step S2107, the CPU 221 captures an image in the capture frame. In step S2108, the CPU 221 starts image transmission to the image forming apparatus 101 via a relay server 103. This capture frame can change the position and size by a drag & drop operation. The operator operates the capture frame so that the help manual and the moving image to be displayed on the reception image display unit 413 of the image forming apparatus 101 fall within the capture frame.

Upon detecting the press of the screen capture transmission start button in step S2105, the CPU 221 confirms the connection state of the VNC client 301 in step S2109. For example, when the remote operation by the VNC client 301 is not performed in step S2102 or when the VNC client 301 is once disconnected although the remote operation is performed in step S2104, a state is set in which the VNC client 301 is not connected.

If the VNC client 301 is not connected in step S2109, the process advances to step S2110. The CPU 221 automatically activates the VNC client 301 to connect the image forming apparatus 101. The process then advances to step S2111. This makes it possible to perform remote operation of the image forming apparatus 101 from the VNC client 301. If connected, the process advances to the process in step S2111.

In step S2111, the CPU 221 automatically transmits, to the VNC client 301, the specific-order-key press information for opening the remote support portal screen 411. Subsequently, in step S2112, the VNC client 301 transmits the received specific-order-key press information to the image forming apparatus 101. Accordingly, the remote support portal screen 411 is displayed on the operation panel 213 of the image forming apparatus 101. This makes it possible for the user to switch the screen to the remote support portal screen 411 without performing a complex operation for pressing software keys 303 of the VNC client 301 in a specific order. Since the remote support portal screen 411 has the reception image display unit 413, the unit 413 allows the user of the image forming apparatus 101 to view the image.

In step S2113, the CPU 221 confirms whether the VNC client 301 is connected. If connected, the process advances to step S2114. In step S2110, the CPU 221 confirms in step S2110 whether the VNC client 301 is connected. If the VNC client 301 is connected in step S2110, the process advances to step S2115. As the VNC client 301 has been connected to automatically transmit the key press information in step S2112, the CPU 221 disconnects the VNC client 301, and the process advances to step S2116. On the other hand, if the VNC client 301 is not connected in step S2108, the process advances to step S2116.

In step S2116, the remote operation to the image forming apparatus 101 can be performed by the VNC client 301 from the operator PC 102. At this time, the remote support portal screen 411 may often be closed by the remote operation of the image forming apparatus 101 by the operator PC 102 and the operation of the operation panel 213 by the user of the image forming apparatus 101. The remote operation in step S2114 need not necessarily be performed.

In step S2117, the CPU 221 then detects the press of the support end button. After that, in step S2118, the CPU 221 confirms the connection state of the VNC client 301. If the VNC client 301 is not connected, the process advances to step S2119. The CPU 221 automatically activates the VNC client 301 to connect to the image forming apparatus 101. The process then advances to step S2120. This makes it possible to perform the remote operation of the image forming apparatus 101 from the VNC client 301. If the VNC client 301 is connected in step S2118, the process advances to step S2120.

In step S2120, the CPU 221 automatically transmits, to the VNC client 301, the specific-order-key press information for opening the remote support portal screen 411. Subsequently, in step S2121, the VNC client 301 transmits the received specific-order-key press information to the image forming apparatus 101. This makes it possible to display the remote support portal screen 411 as the screen of the image forming apparatus 101.

After that, in step S2122, the CPU 221 disconnects the VNC client. In step S2123, the remote support is ended, thereby ending the processing.

As described above, according to this embodiment, the remote support portal screen 411 is displayed in preference to the display of the operation screen of the image forming apparatus 101 by the hard key operation or automatic transmission of the specific-order-key press operation from a remote location. This makes it possible to perform remote support even upon occurrence of an error.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-194773 filed on Sep. 30, 2016, which is hereby incorporated by reference herein in its entirety.

What is claimed is:

1. An information processing system including an image forming apparatus, an information processing apparatus, and a relay server, the image forming apparatus including:

a first memory device that stores a set of instructions; and at least one first processor that executes the instructions in the first memory device to:

upon accepting a first operation of performing a predetermined operation for a hardware key provided in the image forming apparatus, display preferentially, on an operation unit and instead of a displayed normal screen on which operation is restricted due to occurrence of an error, a remote support start screen, wherein the remote support start screen including a start button for performing a remote support start instruction; and upon accepting the remote support start instruction by a user operating the start button, control to obtain identification information for connecting the information processing apparatus from the relay server and display the obtained identification information on the operation unit, and the information processing apparatus including:

a second memory device that stores a set of instructions; and
at least one second processor that executes the instructions in the second memory device to:
accept the identification information by accepting an operation of an operator who uses the information processing apparatus;
connect to the image forming apparatus via the relay server using the accepted identification information; and
upon connecting to the image forming apparatus, activate a client application of the remote support to start the remote support.

2. The system according to claim 1,
wherein the at least one second processor executes the instructions in the second memory device to:
upon accepting a second operation of causing the operator to press keys in a specific order via a screen of the client application, transmit the press information of the specific key to the image forming apparatus; and
wherein the at least one first processor executes the instructions in the first memory device to:
upon reception of the press information of the specific key from the information processing apparatus, display a remote support screen associated with the remote support preferentially on the operation unit.

3. The system according to claim 2, wherein the at least one second processor executes the instructions in the second memory device to:
upon accepting a third operation of causing an operator to press a predetermined button provided in a screen different from the screen of the client application, automatically transmit the press information of the specific key to the image forming apparatus, and transmit image data to the image forming apparatus via the client application.

4. The system according to claim 2, wherein the at least one second processor executes the instructions in the second memory device to:
upon accepting a fourth operation of causing an operator to perform an end instruction for ending the remote support, automatically transmit the press information of the specific key to the image forming apparatus.

5. The system according to claim 3, wherein the at least one second processor executes the instructions in the second memory device to:
in automatically transmitting the press information of the specific key to the image forming apparatus, if the client application is not activated, activate the client application.

6. The system according to claim 5, wherein the at least one second processor executes the instructions in the second memory device to:
in automatically transmitting the press information of the specific key to the image forming apparatus, if the client application is activated, end the client application upon completion of transmission.

7. The system according to claim 1, wherein the first operation is one of a long press of the hardware key, and a simultaneous press of a plurality of hardware keys.

8. An image forming apparatus communicable with an information processing apparatus via a relay server, comprising:
a memory device that stores a set of instructions; and
at least one first processor that executes the instructions to:
upon accepting a first operation of performing a predetermined operation for a hardware key provided in the image forming apparatus, display preferentially, on an operation unit and instead of a displayed normal screen on which operation is restricted due to occurrence of an error, a remote support start screen, wherein the remote support start screen including a start button for performing a remote support start instruction; and
upon accepting the remote support start instruction by a user operating the start button, control to obtain identification information for connecting the information processing apparatus from the relay server and display the obtained identification information on the operation unit.

9. A control method of an information processing system including an image forming apparatus, an information processing apparatus, and a relay server, the method comprising:
in the image forming apparatus,
upon accepting a first operation of performing a predetermined operation for a hardware key provided in the image forming apparatus, displaying preferentially, on an operation unit and instead of a displayed normal screen on which operation is restricted due to occurrence of an error, a remote support start screen, wherein the remote support start screen including a start button for performing a remote support start instruction; and
upon accepting a remote support start instruction by a user operating the start button, obtaining identification information for connecting the information processing apparatus from the relay server and displaying the obtained identification information on the operation unit, and
in the information processing apparatus,
accepting the identification information by accepting an operation of an operator who uses the information processing apparatus;
connecting to the image forming apparatus via the relay server using the accepted identification information; and
upon connecting to the image forming apparatus, activating a client application of the remote support to start the remote support.

10. A control method of an image forming apparatus communicable with an information processing apparatus via a relay server, the method comprising:
upon accepting a first operation of performing a predetermined operation for a hardware key provided in the image forming apparatus, displaying preferentially, on an operation unit and instead of a displayed normal screen on which operation is restricted due to occurrence of an error, a remote support start screen, wherein the remote support start screen including a start button for performing a remote support start instruction; and
upon accepting the remote support start instruction by a user operating the start button, obtaining identification information for connecting the information processing apparatus from the relay server and displaying the obtained identification information on the operation unit.

11. A non-transitory computer-readable storage medium storing a computer program for causing a computer to execute each step of a control method of an image forming apparatus communicable with an information processing apparatus via a relay server, the control method comprising:
    upon accepting a first operation of performing a predetermined operation for a hardware key provided in the image forming apparatus, displaying preferentially, on an operation unit and instead of a displayed normal screen on which operation is restricted due to occurrence of an error, a remote support start screen, wherein the remote support start screen including a start button for performing a remote support start instruction; and
    upon accepting a remote support start instruction by a user operating the start button, obtaining identification information for connecting the information processing apparatus from the relay server and displaying the obtained identification information on the operation unit.

* * * * *